April 4, 1967

R. B. ANNAT ETAL 3,312,048

COMBINE WITH FLOATING HARVESTING PLATFORM

Filed March 3, 1964

Inventors.
ROBERT B. ANNAT &
EDWARD G. METCALFE
BY Tweedale & Gerhardt
Attorneys.

Inventors.
ROBERT B. ANNAT &
EDWARD G. METCALFE
BY Tweedale & Gerhardt
Attorneys.

United States Patent Office 3,312,048
Patented Apr. 4, 1967

3,312,048
COMBINE WITH FLOATING HARVESTING
PLATFORM
Robert B. Annat, Kenilworth, and Edward Geoffrey Metcalfe, Leamington Spa, England, assignors to Massey-Ferguson (United Kingdom) Limited, London, England, a British company
Filed Mar. 3, 1964, Ser. No. 349,074
Claims priority, application Great Britain, Mar. 13, 1963, 9,856/63
9 Claims. (Cl. 56—214)

This invention relates to an agricultural machine for treating crops and more particularly to automatic header height controlling means.

Where agricultural machines such as combines have a cutting header it is desirable if not essential that the height of the header relative to the ground be adjustable not only for transport but for ability to set the depth of cut. The header is usually supported on the machine or combine proper by an adjustable mechanical or hydraulic lifting mechanism that can be controlled by the machine operator.

Because of variations in ground contour and obstacles and obstructions on the ground it was necessary for the operator to constantly control the header height. The reaction time for the operator to visually see a change requirement and then manually make the change often is too long to be effective and the change in height is effected too late to prevent the header from striking the ground or from having too much clearance. In many cases the operator has poor visibility due to crop cover. As a solution to this problem it has been proposed to provide an automatic height control that would utilize a feeler mechanism to control the mechanical or hydraulic header lifting mechanism to maintain a predetermined ground clearance. These automatic controls have in general been complicated and expensive.

It has also been proposed to allow the header mechanism to ride on the ground with the weight thereof supported on the ground. This has a definite disadvantage where the header is large and heavy and would tend to dig itself into the ground due to the great weight on the ground engaging structure.

It is therefore an object of the invention to provide a header supporting system wherein only a portion of the header weight is carried on the ground engaging portion and a portion being carried by the machine proper.

It is a further object to provide a header support system wherein the proportion of the total header weight carried directly on the ground can be varied at will.

Still another object is to provide a header support system wherein the proportion of weight carried directly on the ground will be automatically controlled so as to be a predetermined constant value.

A further object is to provide a header support system that is easily adaptable to present systems and requires only a minimum of additional components while utilizing the present manual height adjusting mechanism.

These and other objects will be readily apparent from the following disclosure and accompanying drawings which illustrates one form that the invention can take and in which.

Figure 1:
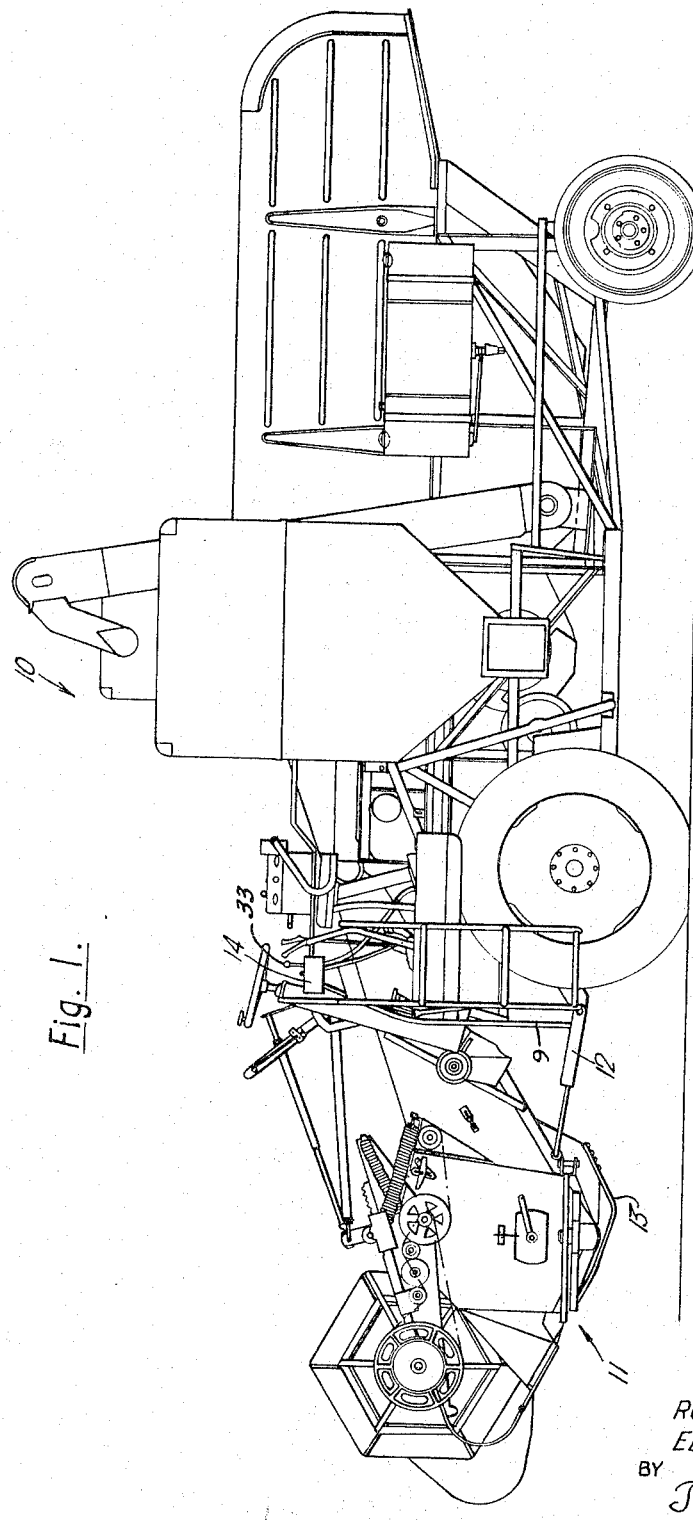
FIG. 1 shows a side elevation of a combine harvester.
Figure 2:
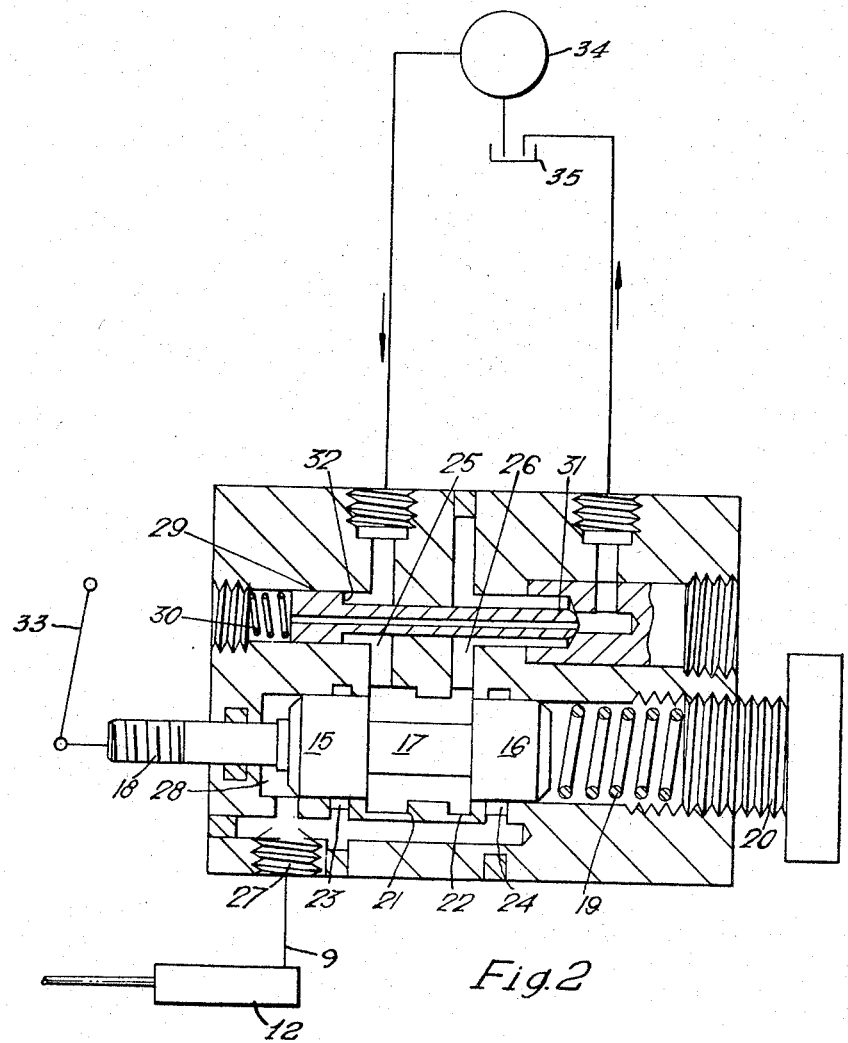
FIG. 2 is a sectional view of fluid operated control means.

Briefly, the present invention provides an agricultural machine for treating crops, and more particularly to harvest the same, the machine including a crop treating part, such as a harvesting header at least one pressure fluid operated device for controlling the height of said part relative to the machine, a source of fluid under pressure operatively associated with said device, ground engaging means on said part, and fluid operated control means in fluid communication with the device and adapted to discharge fluid from the device when the pressure therein exceeds a predetermined value and to connect the source of pressure fluid to the device when the pressure in the device falls below the predetermined value to tend to maintain substantially constant the pressure of the pressure fluid within the device, whereby a substantially constant predetermined proportion of the weight of said part is transmitted to the ground through said ground engaging means.

Preferably the control means includes a piston valve and cylinder valve body arrangement the piston being movable, from a non-operative position in which a predetermined quantity of fluid is trapped in the fluid pressure operated device to a position wherein additional fluid is fed to the device or to a position wherein fluid is allowed to discharge from the device. The movement of the piston is under the influence of the pressure of the fluid in the device.

Preferably also means is provided to condition the piston valve at its non-operative position within the cylinder by a balancing of forces thereon to permit variation of the proportion of the weight of the part carried by the ground engaging means when in engagement with the ground and one of the balancing forces may be from a spring located and acting between an end of the piston valve and an adjustable abutment.

An additional valve is provided in the system which, in its normal position, closes the control means to prevent discharge of pressure fluid from the height controlling device, this additional valve being movable to a second position, where it does not affect the operation of the control means, under the influence of the pressure of the pressure fluid supplied from the source, whereby should the supply of pressure fluid be stopped or fail this additional valve will render the control means ineffective to raise or lower the crop treating part.

The ground engaging means is preferably in the form of a skid plate positioned on the underside of the aforesaid part.

Referring now to the specific embodiment shown it will be seen that we have provided a combine harvester 10 that has the usual crop gathering part or header 11 mounted at the forward end of the harvester and having an adjustable height relative thereto by means of hydraulically operated rams 12 operatively connected to a supply of pressure fluid such as a pump in the harvester 10.

A pair of metal skid plates 13 are rigidly secured to the underside of the header 11, one at each side extremity, to serve as ground-engaging plates when it is desired to operate the harvester with the header held close to the ground. When the skids 13 are in contact with the ground they support a predetermined proportion of the total weight of the header, the remainder of the weight being held by the rams.

If the skids 13 had to support the full weight of the header would tend to dig into the ground when the harvester is operated over undulating ground. Fluid operated control means, generally indicated by the reference 14, prevents this digging and thus enables the harvester to operate with the header or crop gathering or harvesting part working close to ground level.

The control means 14 is in the form of a main valve having fluid communication through line 9 with the rams 12, the valve including a piston mounted to move in a cylinder. The piston comprises first and second piston heads 15, 16 spaced apart and interconnected by a coaxial shank portion 17 of reduced diameter. The first piston head 15 is attached to a piston rod 18 extending axially out of the adjacent end of the cylinder and connected to a manual control 33 to enable manual positioning of the piston within the cylinder. The piston is spring urged towards said adjacent end of the cylinder by a spring 19 located and acting between the second piston head 16 and an adjustable stop 20 mounted to extend into the other end of the cylinder.

The portion of the valve body which, when the valve is not in use, encircles the reduced portion 17 of the piston is recessed to provide first and second axially extending annular slots 21, 22. Third and fourth annular slots 23, 24 are recessed into the portions of the cylinder wall around the piston heads 15 and 16 respectively. Slots 22, 23 and 24 are of substantially the same dimensions while slot 21 is wider than each of the others.

The slots 21, 22 communicate with passages 25, 26 from the pressure fluid supply 34 and to the normal fluid reservoir or sump 35 respectively. The third and fourth slots 23, 24 communicate by way of a common conduit 27 with the lift rams 12, the conduit 27 communicating also with the cylinder space 28 between the first piston head 15 and the adjacent cylinder end. For convenience, when the piston has been positioned to establish these communications it will be considered to be in its center or neutral position.

An additional valve 29 is incorporated in the main valve body and takes the form of a spring loaded plunger extending through the aforesaid passages 25, 26. A spring 30 tends to move the valve 29 to cause the end 31 to close the outlet to the reservoir. When the main valve is in use, the valve 29 is held in an inoperative position against the action of the spring loading 30, by the pressure fluid supply acting on the face 32. Should the supply of pressure fluid fail or be turned off, the spring 30 will move the plunger to close the aforesaid passage 26 and thus close the escape of fluid to the reservoir and prevent raising or lowering of the header. Whenever the supply of pressure fluid is reinstated, the plunger will be moved back to its inoperative position to bring the main valve again into operation. The main purpose of this valve is to provide a safety feature preventing lowering of the header, if for example, the combine is stopped with the header raised.

In use, the header 11 of the harvester can be raised or lowered for transport under manual control of the valve, this control being obtained through appropriate movement of the piston rod 18 which over-rides the normal pressure control of the valve. The header 11 is adjusted, under this manual control to the desired height above ground level with the skids 13 adjusted to engage the ground and carry a proportion of the weight of the header, and the piston in the main valve is set in its center position by means of the adjustable stop 20.

As the header is lowered to the ground a portion of the weight therein will be taken up on the ground engaging skids 13. When the valve is manually returned to its center or neutral position the header will continue to lower until the pressure in the rams 12 caused by the remaining header weight therein, that acts on the end of the valve will balance the force of the spring 19 as set by the adjustment stop 20.

The harvester 10 can then be driven forward with the skids sliding along the ground, the header being supported by the rams and the skids together. At this stage pressure fluid is passing into the main valve by way of the respective passage 25, through the first slot 21, around the shank portion 17 of the piston and out through the second slot 22 and the respective passage 26 to the fluid reservoir. If the header 11 comes to a dip in the ground, a greater part of the whole weight of the header will be taken by the rams 12 as the skids 13 lose contact with the ground. The pressure within the rams 12 is thus increased and transmitted to the cylinder space 28 causing the piston to be moved against the action of its spring loading bringing the fourth slot 24 into communication with the second slot 22 to permit the pressure fluid to discharge out from the rams to the fluid reservoir. The pressure in the rams is thus maintained substantially constant at its previously predetermined or set level and the rams will lower the header until the skids bear against the ground again. Due to the elongation of the first slot 21 the supply of pressure fluid will not be blocked but will pass to the reservoir also by way of the second slot 22.

Should the skids encounter a rise in the ground, they will tend to take more of the weight of the header causing a pressure drop within the rams 12. The piston valve will then move in the direction of its spring loading to bring the third slot 23 into communication with the first slot 21 while closing the second slot 22. This enables pressure fluid to be supplied to the rams to maintain the pressure in the rams substantially constant at the previously predetermined or level as set by stop 20 and to cause the rams 12 to raise the header to prevent it digging into the rise.

It will be understood that the invention can be utilized on agriculture implements other than combines. For example the system could be utilized on swathers, mowers, forage harvesters or other machines wherein a portion of the machine must be carried close to the ground. Other uses and arrangements will become apparent to those skilled in the art and are considered to be within the scope of the invention which is limited only by the following claims.

We claim:
1. In an agricultural machine for treating crops, having a crop treating part, means for controlling the height of the part relative to the machine including a pressure fluid operated device between said machine and said part for carrying a portion of the total weight of said part on the machine, a source of fluid under pressure operatively associated with said device, ground engaging means on said part for carrying a portion of the total weight of said part, and fluid operated control means in fluid communication with the device and responsive to changes in pressure therein to discharge fluid from the device to cause lowering of the part when the pressure therein exceeds a predetermined valve corresponding to more than a predetermined weight on said device and to connect the source of pressure fluid to the device to cause raising of the part when the pressure in the device falls below said predetermined value, said raising and lowering tending to maintain the pressure of the pressure fluid within the device, at a substantially constant value whereby a substantially constant predetermined proportion of the weight of said part is carried by said ground engaging means.

2. The agricultural machine as claimed in claim 1 in which the control means includes pressure responsive valve means, said valve means being movable from a neutral position in response to changes in the pressure of the fluid in the device to cause supply or discharge of the pressure fluid to or from the device.

3. The agricultural machine as claimed in claim 2 in which said control means further includes adjustable means acting on said pressure responsive valve means in opposition to pressure in said device whereby the pressure in said device required to maintain said valve means in said neutral position can be adjusted.

4. The agricultural machine as claimed in claim 3 wherein said adjustable means is a spring extending between said valve and an adjustable abutment.

5. The agricultural machine of claim 2 wherein manual over-control means are provided to move said valve means from said neutral position independently of the pressure in said device.

6. The agricultural machine of claim 1 wherein said control means includes pressure responsive means responsive to a pressure drop in said source of fluid to prevent discharge of fluid from said device regardless of the value of pressure in said device.

7. The agricultural machine of claim 6 wherein said pressure responsive means is a valve urged by pressure from said supply into a position to prevent discharge of fluid from said device and spring means normally biasing said valve into a position allowing said discharge.

8. The agricultural machine of claim 1 wherein said ground engaging means is formed by at least one skid plate positioned on the underside of said crop treating part.

9. A combine machine, a harvesting platform adjustably carried on said machine by a fluid pressure hydraulic ram, ground engaging means on said platform for carrying a portion of the platform weight when said ram is adjusted to lower the platform relative to the machine, control means for said ram including valve means responsive to changes in the weight carried by said ram for causing raising and lowering of the platform to maintain the portion of weight of the platform carried by said ram at a constant value, means for adjusting said valve means to vary the constant value of platform weight carried by said ram, and manual over-control means operative on said control means for causing raising or lowering of said platform regardless of the platform weight carried by said ram.

References Cited by the Examiner
UNITED STATES PATENTS

| | | | |
|---|---|---|---|
| 2,514,764 | 7/1950 | Herigstad | 56—208 |
| 2,913,878 | 11/1959 | Rue | 56—20 X |

ANTONIO F. GUIDA, Acting Primary Examiner.

ABRAHAM G. STONE, Examiner.